3,067,051
LONG-CHAIN MONOALKYLSILANES AS WATER-REPELLENTS
Alfred Lester Oppegard, New Castle, and Hasley Bidwell Stevenson, Wilmington, Del., assignors to E. I. du Pont de Nemours and Company, Wilmington, Del., a corporation of Delaware
No Drawing. Filed Sept. 18, 1959, Ser. No. 840,810
10 Claims. (Cl. 106—285)

This invention relates to, and has as its principal objects provision of, novel moisture-proofing compositions, a novel moisture-proofing process and novel water-proofed manufactures.

Moisture penetration of masonary and other water-pervious materals used in construction is a recognized serious industrial problem. Coating of the outside face of brick and concrete walls with asphalt or a drying oil paint is one means commonly used for overcoming moisture penetration in basements and above-ground walls by ground water or rain. This treatment, while of some benefit, is not the answer to the problem because any moisture in the wall is trapped behind the surface barrier.

There are many preparations on the market designed to cope with the moisture-penetration problem and still permit diffusion of moisture through the surface. Basically, they are of two types. One type is based on Portland cement. These cements are relatively low in cost and are quite satisfactory when properly applied. For optimum results they require application over a wet surface in such a way as to fill all voids. After application the surface must be kept moist until the cement is cured, which may require up to a week. If more than one coat is required, the second coat must be applied similarly to the first coat. In closed spaces, as in basements, drying out is slow, which means that for all practical purposes the basement is unusable for a long period of time.

The other type of moisture-sealing composition commonly used is that based upon silicones. Such compositions, however, are relatively expensive because they are made by hydrolysis of chlorosilanes. There is need for the provision of moisture- and waterproofing compositions for masonry surfaces which are free of the shortcomings which characterize presently available products.

This invention provides new moisture- and waterproofing compositions which are effective for brick and concrete and other water-pervious materials.

The compositions of this invention are based on monalkylsilanes in which the alkyl group contains at least 10 carbons in a straight chain. According to this invention, water-pervious surfaces are rendered water-impervious by treating them with compositions containing the indicated silanes in a liquid vehicle, and allowing the surfaces to dry.

The monoalkylsilanes used in the practice of this invention are preferably the mono-n-alkylsilanes and mixtures of mono-n-alkylsilanes in which the n-alkyl group contains from 10 to 30 carbon atoms. These silanes can be conveniently made by the free-radical catalyzed addition of silane to terminally unsaturated olefins, and mixtures thereof, containing at least 10 carbon atoms in a straight chain.

One method for testing the alkylsilanes of this invention is as follows:

An 8-inch sand face brick is cut into eight 2-inch cubes. A face is selected which in normal use would be exposed to the weather and to this 2″ x 2″ face is applied a solution or dispersion of the alkylsilane under test. The treated brick is then allowed to dry and a preliminary evaluation of its water-repellency is made by spraying a fine stream of water against the treated surface. After drying, a 1″ x 13″ open glass tube is sealed to the treated surface with a 60/40, by weight, beeswax-rosin mixture applied hot to the base of the tube and carried down 0.25 inch over the side of the brick. The glass tube is marked at 1-inch intervals and is filled with water to the 12-inch level. Readings of the drop in water level are made at selected time intervals.

The examples which follow illustrate but do not limit this invention.

*Example I*

A 400-ml. stainless steel shaker reactor is charged with 2 g. di-tert.-butyl peroxide, 168 g. 1-hexadecene, and 16 g. silane and the charge is heated for 10 hours at 130° C. The product obtained consists of a mixture of solid and liquid. The liquid is filtered off and distilled to give 40 g. of n-hexadecylsilane, boiling at 158–160° C. at 8 mm.; $n_D^{25}$, 1.4457.

*Analysis.*—Calcd. for $C_{16}H_{36}Si$: Si, 10.95%; Si—H, 1.18%. Found: Si, 11.03%; Si—H, 1.17%.

The solid is recrystallized from isopropyl alcohol to give 50 g. of di-n-hexadecylsilane, M.P. 49–50° C.

*Analysis.*—Calcd. for $C_{32}H_{68}Si$: Si, 5.83%. Found: Si, 6.08%.

Five-hundredths of a gram of n-hexadecylsilane, prepared as above and dissolved in 5 cc .of benzene is uniformly deposited on a 2″ x 2″ surface of a sand face brick, as previously described. After aging for 28 days a 1″ x 13″ glass tube is attached to the treated brick surface and water to a height of 12″ is placed in the tube. After 24 hours the height of the water has dropped only $\frac{1}{16}$″ and in 34 days but $1\frac{3}{8}$″. This loss in height is equivalent to the loss from a 1″ test tube, filled to within 1″ of the top, due to normal evaporation.

A brick treated in the same way as above with 0.05 g. of a commercial silicone recommended for waterproofing masonry and made by cohydrolysis of mixed methylchlorosilanes gives losses in height of water of $\frac{1}{8}$″ in 24 hours and $1\frac{1}{2}$″ in 34 days.

An untreated brick surface tested in the same way loses $1\frac{1}{2}$″ of water in 24 hours and all 12″ in 14 days.

The above experiment is repeated, except that the surface treated is concrete block. Similar results are obtained.

*Example II*

Bricks are treated as described in Example I with benzene solutions containing 0.01 g. of the agents listed in the left column of the table below, and at like concentrations, so as to deposit uniformly 0.01 gram of the agent on the brick. A 2″ x 2″ face is used and the fall in height of a 12″ column of water is recorded as before. Results are summarized below:

| Agent | Drop in Hgt. of $H_2O$ in— | |
|---|---|---|
| | 24 hours | 5 days |
| | Inches | Inches |
| n-Hexadecylsilane | $\frac{1}{16}$ | $\frac{1}{4}$ |
| Di-n-hexadecylsilane | $1\frac{1}{4}$ | $4\frac{1}{2}$ |
| Commercial silicone | $\frac{1}{8}$ | $\frac{1}{4}$ |
| Untreated brick (control) | $1\frac{7}{16}$ | $4\frac{1}{8}$ |
| Open test tube (evaporation) | $\frac{1}{16}$ | $\frac{1}{4}$ |

The above table shows that the n-hexadecylsilane compares favorably in effectiveness with a commercial silicone, whereas at like concentrations the dialkylsilane, di-n-hexadecylsilane, is no more effective than the untreated brick control.

*Example III*

To determine the minimum amount of the various silicon compounds under test needed to prevent the penetration of brick surfaces by water, serial dilutions are carried out starting at a level of 0.01 g. of agent for a 2" x 2" brick surface. Results are given in the following table:

| Silicon Compound | Least Effective Amount mg./sq. in. | Amount of Si, mg./sq. in. | Drop in Hgt. of $H_2O$ in 24 hours |
|---|---|---|---|
| n-Hexadecylsilane | 1.25 | 0.14 | Inches ⅛ |
| Commercial silicone (control) | 0.63 | 0.23 | ⅛ |

Di-n-hexadecylsilane is effective only at levels of 10 mg./sq. in. or higher, showing the adverse influence of having more than one alkyl group on the silicon.

As shown by the foregoing examples, application of as little as 1.25 mg./sq. in. (1 lb./2500 sq. ft.) of the monoalkylsilane to the pervious surface prevents penetration of the surface by water under hydrostatic pressure. Compared with the commercial silicone control, only slightly over half as much silicon/sq. in. of treated surface is required to obtain the same protection against water penetration.

*Example IV*

One hundred fifty grams of $C_{10}$ to $C_{20}$ mixed α-olefins and 2 grams of di-tert-butyl peroxide are placed in a 400-ml. stainless steel pressure reactor. There is then added 32 grams of silane. The reactor is closed and the charge heated for 10 hours at 130° C. Thereafter, the reaction mixture is allowed to cool to ambient temperature, unreacted silane is vented to the atmosphere, and the contents discharged. The product is a clear, almost colorless liquid which analyzes 9.89% silicon, 75.91% carbon, and 13.91% hydrogen. Infrared analysis shows no carbon-to-carbon unsaturation of and the Si—H stretching corresponds to a mixture of $SiH_2$ and $SiH_3$.

A 0.2% benzene solution of the alkylsilane mixture, prepared as above, is applied to bricks in the manner of Example I at a level of 2.5 mg./in.² and the treated bricks are allowed to age 2.5 days at ambient temperature before testing. The results are summarized below:

| Agent | Drop in Height of Water Level in Inches | | | |
|---|---|---|---|---|
| | 1 Hour | 1 Day | 2 Days | 1 Month |
| $C_{10}$–$C_{20}$ alkylsilane mixture | 0.0 | 0.0 | 0.0 | 0.3 |
| Commercial silicone | 0.0 | 0.2 | 0.3 | 1.1 |
| Untreated brick control | 0.3 | 2.0 | 3.0 | 12.0+ |

*Example V*

To 200 mg. of the n-hexadecylsilane of Example I there is added 100-ml. of distilled water and one drop of a 10% aqueous solution of a commercial dispersing agent (an octylphenol-ethylene oxide condensation product), and the mixture shaken vigorously. The resulting emulsion is applied to bricks in the manner of Example I with similar results.

In place of the dispersing agent used in the above composition there may be used any other known dispersing agent, e.g., alkali metal salts of fatty acids, long chain sulfates, etc.

Alkylsilanes which can be used in the process of this invention are those derived from alpha-olefins containing at least 10 carbons in a straight chain. Illustrative of such n-alkylsilanes are n-dodecylsilane, n-tetradecylsilane, n-hexadecylsilane, no-octadecylsilane, n-eicosylsilane, n-tricosylsilane, decacosylsilane, and mixtures thereof.

In making the solutions of the n-alkylsilanes any aromatic or aliphatic, including cycloaliphatic, hydrocarbon solvent can be used. Examples of such solvents are toluene, xylene, high boiling naphthas, cyclohexane, tetrahydro- and decahydronaphthalenes, and the like. Alternatively, the alkylsilanes can be applied from aqueous dispersions, as illustrated in Example V.

The alkylsilanes are deposited on the pervious substrates from solutions or dispersions which contain at least 0.1% of the alkylsilane by weight, based on the solvent or dispersing medium. The upper limit of concentration is determined solely by the solubility or dispersing characteristics of the alkylsilane. In practice, it is preferred to employ solutions or dispersions of as high solids content as possible and to reduce these to application concentration before use. Generally, the solutions or dispersions may contain up to 30% or more of alkylsilane by weight.

If desired modifiers such as pigments and fillers may be incorporated in the solutions or dispersions of the alkylsilanes.

For best results it is desirable to permit the treated surface to age for at least 24 hours before testing. This is shown in the table below, in which the coating on the brick is the $C_{10}$–$C_{20}$ alkylsilane product of Example IV, applied to the brick in the manner and weight of coating of Example IV.

| Time in hrs. before testing | Drop in water level in inches | | | |
|---|---|---|---|---|
| | 1 Hr. | 1 Day | 2 Days | 5 Days |
| 3 | 0.2 | 1.3 | 2.0 | |
| 6 | 0.1 | 1.1 | 1.8 | |
| 8 | 0.0 | 0.2 | 0.2 | |
| 16 | 0.1 | 0.8 | | 0.3 |
| 24 | 0.0 | 0.0 | | 0.0 |
| 40 | 0.0 | 0.0 | | 0.1 |

These alkylsilanes are generally applied to the water-pervious substrate at a rate of at least 2.5 mg. thereof per 2" x 2" surface of substrate. It is sometimes desirable to use larger quantities, such as 10 to 80 mg. per 2" x 2" of porous substrate (2–16 lbs./2500 sq. ft.).

As a rule, the longer the alkyl group the more effective the waterproofing effect, and outstanding results are achieved when the alkyl group contains from 10 to 30 carbon atoms. Alkysilanes with alkyl groups of more than 30 carbons are not generally employed because they are difficultly soluble in the common organic solvents.

The pervious substrates which can be treated with the alkylsilanes of this invention include clay, shale, and sand brick, cinder and concrete block, concrete, stucco, etc.

Since obvious modifications and equivalents in the invention will be evident to those skilled in the chemical arts, we propose to be bound solely by the appended claims.

What is claimed is:

1. A coating composition consisting essentially of a liquid carrier selected from the group consisting of water and normally liquid hydrocarbons and 0.1–30% by weight, based on said carrier, of a monoalkylsilane in which the alkyl group contains 10–30 carbons in a straight chain.

2. The composition of claim 1 wherein the carrier is an aromatic hydrocarbon.

3. The compensation of claim 1 wherein the carrier is benzene.

4. The composition of claim 1 wherein the monoalkylsilane is n-hexadecylsilane.

5. As a coating composition, an aqueous dispersion of about 0.1–30% by weight, based on the water present, of a monoalkylsilane in which the alkyl group contains 10 to 30 carbons in a straight chain.

6. A manufacture formed from a water-pervious material of construction bearing a water-impervious coating of a monoalkylsilane in which the alkyl group contains 10 to 30 carbons in a straight chain.

7. The manufacture of claim 6 wherein the alkylsilane is n-hexadecylsilane.

8. A method of reducing the water-perviousness of a porous surface which comprises coating the surface with a monoalkylsilane in which the alkyl group contains 10 to 30 carbons in a straight chain.

9. The process of claim 8 wherein the monoalkylsilane used is n-hexadecylsilane.

10. The process of claim 8 wherein the porous surface to be treated is that of masonry.

References Cited in the file of this patent

UNITED STATES PATENTS

| | | |
|---|---|---|
| 2,537,763 | Hurd | Jan. 9, 1951 |
| 2,574,168 | Brick | Nov. 6, 1951 |
| 2,774,690 | Cockett | Dec. 18, 1956 |
| 2,877,201 | Bonza | Mar. 10, 1959 |
| 2,905,562 | Brown | Sept. 22, 1959 |

OTHER REFERENCES

S. Tannenbaum et al.: J. Am. Chem. Soc., vol. 75, pp. 3753–3757, 1953.

UNITED STATES PATENT OFFICE
CERTIFICATE OF CORRECTION

Patent No. 3,067,051 December 4, 1962

Alfred Lester Oppegard et al.

It is hereby certified that error appears in the above numbered patent requiring correction and that the said Letters Patent should read as corrected below.

In the grant, line 2, and in the heading to the printed specification, lines 4 and 5, for "Hasley Bidwell Stevenson", each occurrence, read -- Halsey Bidwell Stevenson --; column 4, line 65, for "compensation" read -- composition --.

Signed and sealed this 28th day of May 1963.

(SEAL)
Attest:

ERNEST W. SWIDER
Attesting Officer

DAVID L. LADD
Commissioner of Patents